US006172620B1

(12) United States Patent
Brick et al.

(10) Patent No.: US 6,172,620 B1
(45) Date of Patent: Jan. 9, 2001

(54) PORTABLE DATA TERMINAL WITH MODULAR KEYPAD

(75) Inventors: Frank E. Brick; Timothy P. O'Hagan, both of The Woodlands, TX (US)

(73) Assignee: Telxon Corporation, Akron, OH (US)

( * ) Notice: Under 35 U.S.C. 154(b), the term of this patent shall be extended for 0 days.

(21) Appl. No.: 09/046,997

(22) Filed: Mar. 24, 1998

(51) Int. Cl.$^7$ .................................................. H03K 17/94
(52) U.S. Cl. ..................... 341/22; 345/169; 200/302.1; 200/512; 379/428; 379/437
(58) Field of Search .................. 341/22; 379/93.27, 379/368, 428, 437; 708/145; 200/5 A, 512, 302.1; 345/169

(56) References Cited

U.S. PATENT DOCUMENTS

| 4,279,021 | | 7/1981 | See et al. . | |
|---|---|---|---|---|
| 4,862,499 | * | 8/1989 | Jekot et al. | 379/368 |
| 4,892,981 | * | 1/1990 | Soloway et al. | 200/5 A |
| 5,202,817 | | 4/1993 | Koenck et al. . | |
| 5,575,576 | | 11/1996 | Roysden, Jr. . | |
| 5,576,981 | | 11/1996 | Parker et al. . | |
| 5,679,943 | | 10/1997 | Schultz et al. . | |
| 5,940,015 | * | 12/1999 | Thornton et al. | 379/368 |
| 6,009,164 | * | 12/1999 | Yun | 379/93.27 |

* cited by examiner

Primary Examiner—Michael Horabik
Assistant Examiner—Timothy Edwards, Jr.
(74) Attorney, Agent, or Firm—Renner, Otto, Boisselle & Sklar, LLP

(57) ABSTRACT

A portable data terminal is provided having a main housing including electronic circuitry for receiving data via an operator input. A keypad module is selectively securable into a receiving area of the main housing. A coupling provides an electrical connection between the keypad module and the electronic circuitry within the main housing when the keypad is secured into the receiving area. The coupling maintains an environmental seal between the receiving area and an interior of the main housing in which the electronic circuitry is located.

14 Claims, 5 Drawing Sheets

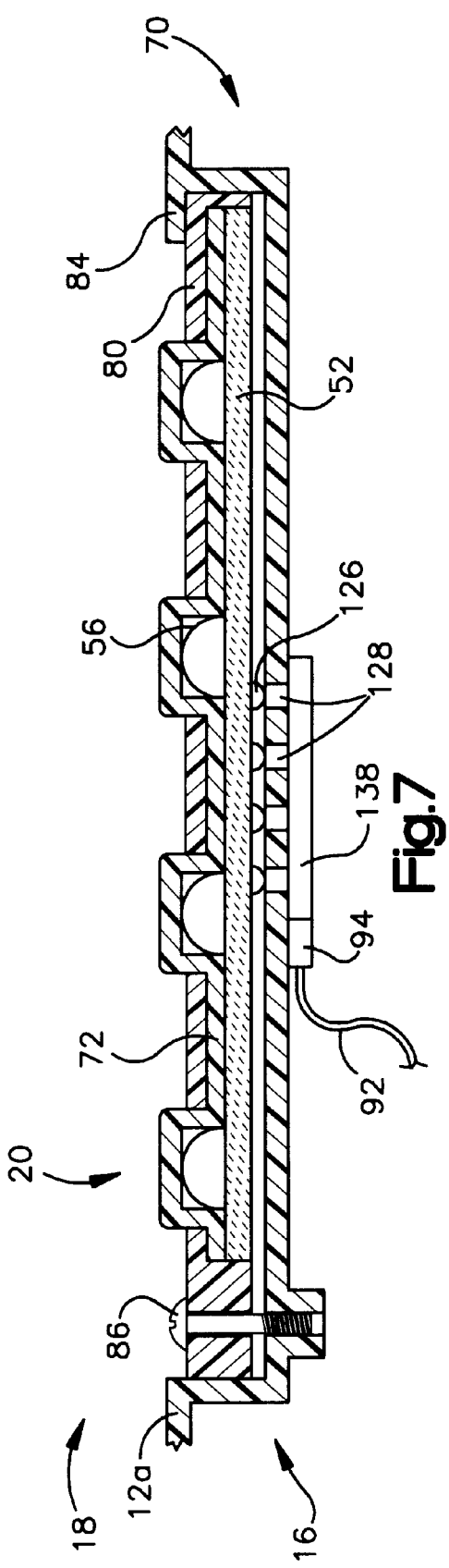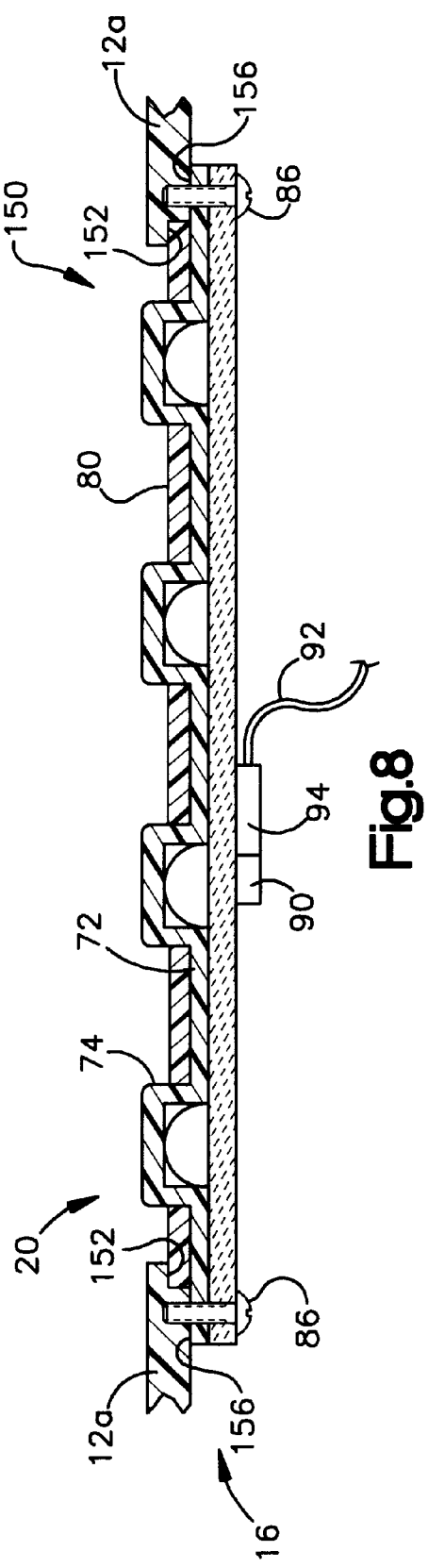

PORTABLE DATA TERMINAL WITH MODULAR KEYPAD

TECHNICAL FIELD

The present invention relates generally to a portable data terminal, and more particularly to a portable data terminal with a modular keypad.

BACKGROUND OF THE INVENTION

In recent years, the use of portable data terminals to gather, store and/or process information has become increasingly popular. For instance, portable data terminals permit users to conduct word processing, computations, spreadsheet analysis, etc. while traveling or at remote locations. Portable data terminals in the form of personal data assistants (PDAs) allow users to store electronically personal and business information in an organized fashion which may be subsequently downloaded to a main database. Retail stores and warehouses often use portable data terminals in order to keep track of inventory or replenish stock. Hospital personnel use such terminals to keep track of patient information while making rounds. Furthermore, portable data terminals are often used by delivery personal and insurance inspectors to gather data at field locations in order to reduce the amount of paper and to increase efficiency in recording data.

Oftentimes the portable data terminals form part of a wireless network in which data collected within the terminals is communicated to a host computer via a wireless link. For example, the portable data terminals include a radio or optical transceiver for communicating with a host computer via a base station.

Most portable data terminals are constructed generally of the same types of components. For example, portable data terminals typically include a processor for controlling operations and processing information; memory for storing information; a display for displaying information; a keypad for permitting an operator to input data and function commands; etc. Thus, many components utilized in portable data terminals are the same regardless of the particular application (e.g., whether as a word processor, PDA, inventory data collector, patient data collector, etc.). The primary difference is the particular software which is loaded into the data terminal.

Nevertheless, it is typically desirable to utilize a keypad in the portable data terminal which is customized for the particular application. For example, rather than a generic keypad which includes keys with labels which are nondescript descript (e.g., F1, F2, etc.), it is preferable to have a keypad which is specific to the particular application. A portable data terminal used in inventory data collection may have keys designated with labels such as "Stock Item", "Quantity", etc. A portable data terminal for use in a hospital may include keys with labels such as "Patient", "Blood Pressure", etc. Such keys are useful to the operator for providing a clear indication of the function of the respective keys.

Accordingly, there is a need for a portable data terminal which is configurable to accept any of a plurality of different keypads. This allows a keypad having keys labeled with application specific functions to be utilized in an otherwise generic data terminal. Portable data terminals may be assembled by a system integrator using generic components and an application specific keypad. Software may be loaded into the terminal as appropriate.

There have been attempts in the past to provide such a portable data terminal, but these attempts have met with limited success. As an example, U.S. Pat. No. 5,576,981 describes a portable computer with an interchangeable keypad. However, the reference does not clearly describe a means for carrying out such interchangeability in a practical device. U.S. Pat. No. 5,202,817 describes a data capture system with interchangeable keyboard modules, but does not address many of the configuration and environmental issues that can arise in a practical device.

In view of the aforementioned shortcomings associated with conventional devices, there is a strong need in the art for a portable data terminal which may be configured with any of a plurality of different modular keypads in a practical manner. More specifically, there is a strong need for a portable data terminal which is may be easily integrated with a selected modular keypad. Moreover, there is a strong need for such a portable data terminal which includes a modular keypad and is yet rugged enough to handle everyday usage and withstand adverse conditions (e.g., water, dirt, debris, etc.).

SUMMARY OF THE INVENTION

According to a particular aspect of the invention, a portable data terminal is provided. The portable data terminal includes a main housing with electronic circuitry enclosed therein for receiving data via an operator input. The main housing includes a receiving area into which a keypad module is selectively securable. The keypad module includes keys which may be pressed by an operator. In addition, the portable data terminal includes a coupling for providing an electrical connection between the keypad module and the electronic circuitry within the main housing when the keypad is secured into the receiving area. The coupling further serves to maintain an environmental seal between the receiving area and an interior of the main housing in which the electronic circuitry is located.

According to another aspect of the invention, a portable data terminal is provided which includes a main housing. The main housing has electronic circuitry therein for receiving data via an operator input, and further includes a receiving area. A keypad module is provided which is selectively securable into the receiving area of the main housing. The keypad module includes a keypad matrix having a plurality of row conductors and a plurality of column conductors arranged on a substrate corresponding to keys which may be pressed by an operator positioned at the intersections of the row conductors and the column conductors. The portable data terminal further includes coupling means for providing an electrical connection between an electrical output of the keypad module and the electronic circuitry within the main housing when the keypad module is secured in the receiving area.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 7 is a cross-sectional view of a keypad module and main housing configuration taken along line A—A of FIG. 1 in accordance with a third embodiment of the present invention;

FIG. 8 is a cross-sectional view of a keypad module and main housing configuration taken along line A—A of FIG. 1 in accordance with a fourth embodiment of the present invention;

DESCRIPTION OF THE PREFERRED EMBODIMENTS

Figure 1:
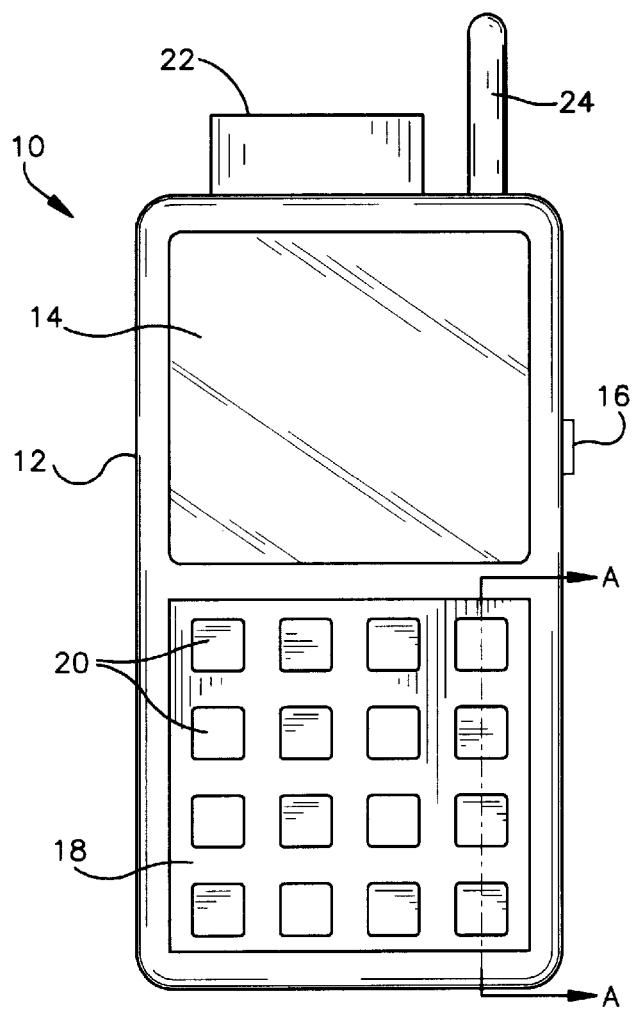
FIG. 1 is a front view of a portable data terminal with modular keypad in accordance with the present invention.

The present invention will now be described with reference to the drawings, in which like reference numerals are used to refer to like elements throughout.

Referring initially to FIG. 1, shown is an exemplary portable data terminal (PDT) 10 in accordance with the present invention. The PDT 10 includes a main housing 12 made of molded plastic or the like. The main housing 12 preferably is sized to fit conveniently in the hand of an operator. Included within the main housing 12 is a display 14. The display 14 may be a conventional liquid crystal display (LCD) such as an active matrix LCD or the like. Alternatively, the display 14 may be an electroluminescent type display, etc.

The PDT 10 further includes a keypad receiving area 16 within the housing 12 for receiving any of a plurality of different keypad modules. An exemplary keypad module 18 is shown in FIG. 1 as included in the PDT 10. The keypad module 18 includes a plurality of different keys 20 arranged in a predefined configuration. Each key 20 includes thereon a label (not shown) indicative of the particular function of the key. The processor within the PDT 10 (discussed in more detail in connection with FIG. 3) is programmed to interpret a given key 20 in accordance with the particular function identified by the label or otherwise assigned to such key 20. Each key 20 may be depressed by the operator in order to enter information and/or cause the PDT 10 to perform a desired function.

In the exemplary embodiment, the keypad module 18 is shown as having a 4-by-4 matrix of keys 20. However, it will be appreciated that other arrangements of keys 20 could also be used without departing from the scope of the invention.

The PDT 10 also includes, for example, a bar code reader 22 which allows the operator to input information from bar code labels. Furthermore, the PDT 10 includes an antenna 24 which allows the PDT 10 to communicate wirelessly with a base station in a wireless network, for example. As will be discussed more fully with reference to FIG. 3, the PDT 10 in the exemplary embodiment includes a radio transceiver which permits the PDT 10 to communicate wirelessly with other devices such as a base station in a wireless network.

In addition, the PDT 10 includes a communication port 26 exposed through a wall of the main housing 12. The communication port 26 permits the PDT 10 to communicate information and/or download software via a hardwired connection. The port 26 may be any type of standard connector which allows the electronic circuitry within the PDT 10 to communication with another device.

Figure 2:
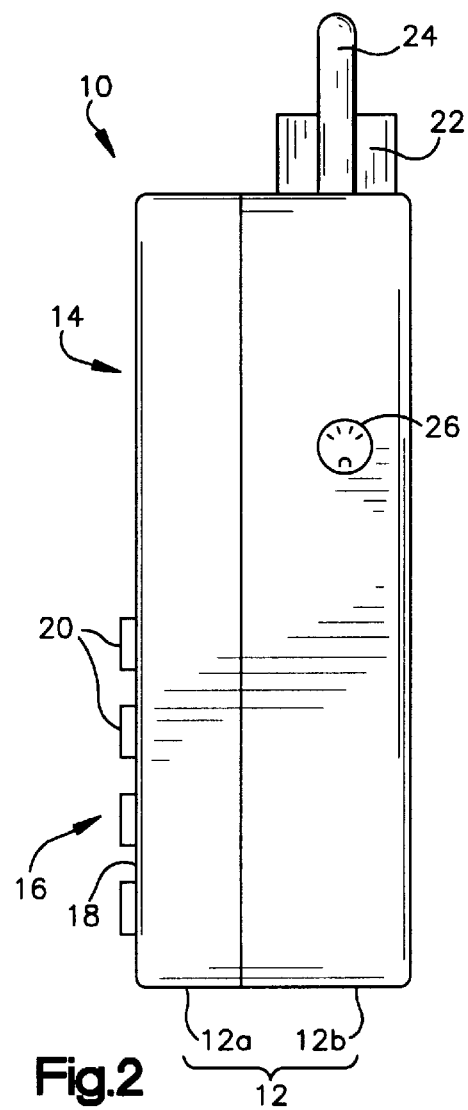
FIG. 2 is a side view of the portable data terminal of FIG. 1 in accordance with the present invention.

Turning briefly to FIG. 2, a side view of the PDT 10 is shown. As can be seen, the main housing 12 of the PDT 10 is made up of an upper portion 12a and a lower portion 12b. The various components within the main housing 12 are assembled within the respective portions 12a and 12b, and the two portions are then joined together to form an integral housing 12. The portions 12a and 12b may be fixed together via a set of screws, a snap fit, etc. The particular means by which the portions 12a and 12b are joined together is not critical to the invention.

Figure 3:
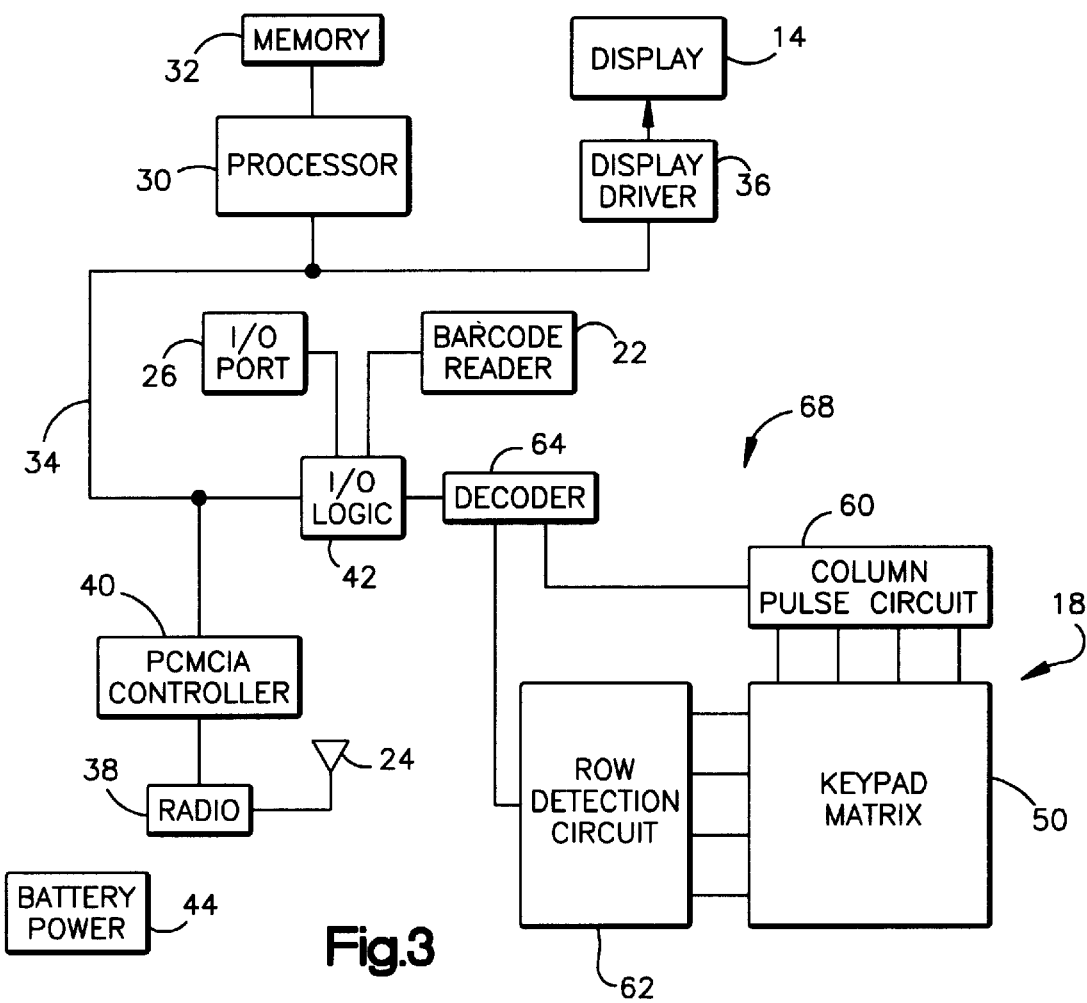
FIG. 3 is a block diagram representing the electronic circuitry included in the portable data terminal in accordance with the present invention.

FIG. 3 illustrates the electronic circuitry included within the main housing 12 of the PDT 10. The PDT 10 is controlled primarily by a processor 30. The processor 30 executes instructions stored in a non-volatile memory 32 for carrying out the various intended operations of the PDT 10. The particular instructions stored in the memory 32 may represent a program which is loaded into the PDT 10 via the communication port 26, for example. In addition, the processor 30 uses the memory 32 to store data or other information which is collected via the PDT 10 (e.g., inventory or patient information, depending on the particular application).

The processor 30 is connected to an ISA bus 34 or other conventional type bus. The display 14 is coupled to the bus 34 via a display driver 36. The processor 30 is programmed to cause the display 14 to represent graphically to the operator appropriate display information during operation via the display driver 36. Such operation is conventional, hence further detail is omitted for sake of brevity.

The PDT 10 includes a radio transceiver 38 which permits the PDT 10 to communicate wirelessly with other devices, such as a base station, using conventional techniques. The transceiver 38 is coupled to the processor 30 via the bus 34 and a PCMCIA controller 40 as shown. In the event the PDT 10 is to transmit information to another device, the processor 30 provides such information to the transceiver 38 via the bus 34 and the controller 40. The transceiver 38 in turn transmits the information as part of an RF signal to the other device using the antenna 24. On the other hand, information which is transmitted to the PDT 10 from another device is received by the transceiver 38 via the antenna 24. The transceiver in turn provides the information to the processor 30 via the controller 40 and the bus 34.

The PDT 10 also includes an input/output (I/O) logic array 42 which provides conventional logic for receiving the respective input signals and output signals from the various I/O devices. Information to/from the communication port 26 and the barcode reader 22 is coupled to the processor 30 via the logic array 42 and the bus 34 using conventional techniques. Moreover, the PDT 10 includes a battery based power supply 44 which provides the appropriate operating power to the various components within the PDT 10.

Figure 4:
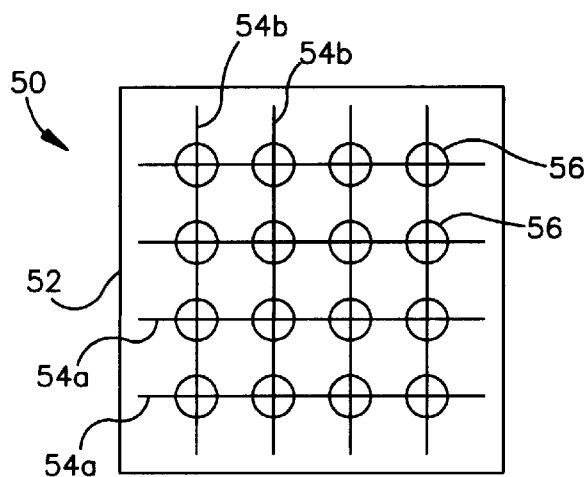
FIG. 4 is a schematic illustration of a keypad matrix forming part of a modular keypad in accordance with an exemplary embodiment of the present invention.

Each keypad module 18 includes a keypad matrix 50 which is shown in more detail in FIG. 4. Generally speaking, the keypad matrix 50 is made up of a printed circuit board substrate 52 having an M-by-N array of conductive traces represented by rows 54a and columns 54b. In the present embodiment, M=N=4. Located at the intersection of each row trace 54a and column trace 54b is a flexible dome-shaped contact 56 as is known. Each contact 56 represents a respective key 20 on the keypad. A downward force exerted on a given contact 56 causes the dome to collapse thereby creating an electrical connection between otherwise exposed contacts of the row trace 54a and column trace 54b intersecting thereat. When no downward force is exerted on the given contact 56, the row 54a and column 54b traces intersecting thereat remain electrically isolated at such intersection.

Referring back to FIG. 3, each of the column traces 54b is connected to a respective output of a column pulse circuit 60. The column pulse circuit 60 provides pulses sequentially onto each column trace 54b as is known. The row traces 54a from the keypad matrix 50 are connected to respective inputs of a row detection circuit 62. The circuit 62 serves to detect when a pulse provided along one of the column traces 54b appears on one of the row traces 54a. As is known, such pulses will appear on the row traces 54a as a result of a given contact 56 being depressed. By comparing the row trace 54a on which a pulse appears with the time at which a pulse is provided on the respective column traces 54b, it is possible to discern which particular contact 56 in the matrix 50 has been depressed at a given point in time.

The outputs of the column pulse circuit 60 and the row detection circuit 62 are provided to a decoder 64 which determines the particular contact 56 which is depressed at a given time according to the above described logic. The output of the decoder 64 is provided to the I/O logic array 42, which in turn communicates to the processor 30 the particular key 20 that has been depressed by the operator. The processor 30 consequently carries out the particular operation associated with such key.

The particular operation of the column pulse circuit 60, row detection circuit 62, and decoder 64 is well known in the art. Hence, additional detail is omitted. Other techniques for determining which key 20 in a keypad matrix is pressed can also be utilized without departing from the scope of the invention. For example, keypad decoding based on resistance level measurements, etc. may also be used. The particular circuitry for determining which of the contacts 50 are depressed on the keypad matrix 50 (e.g., column pulse circuit 60, row detection circuit 62 and decoder 64) is referred to generally herein as the "iscanning" circuitry 68. The output of the scanning circuitry 68 represents to the processor 30 a given key 20 which is pressed.

Figure 5:
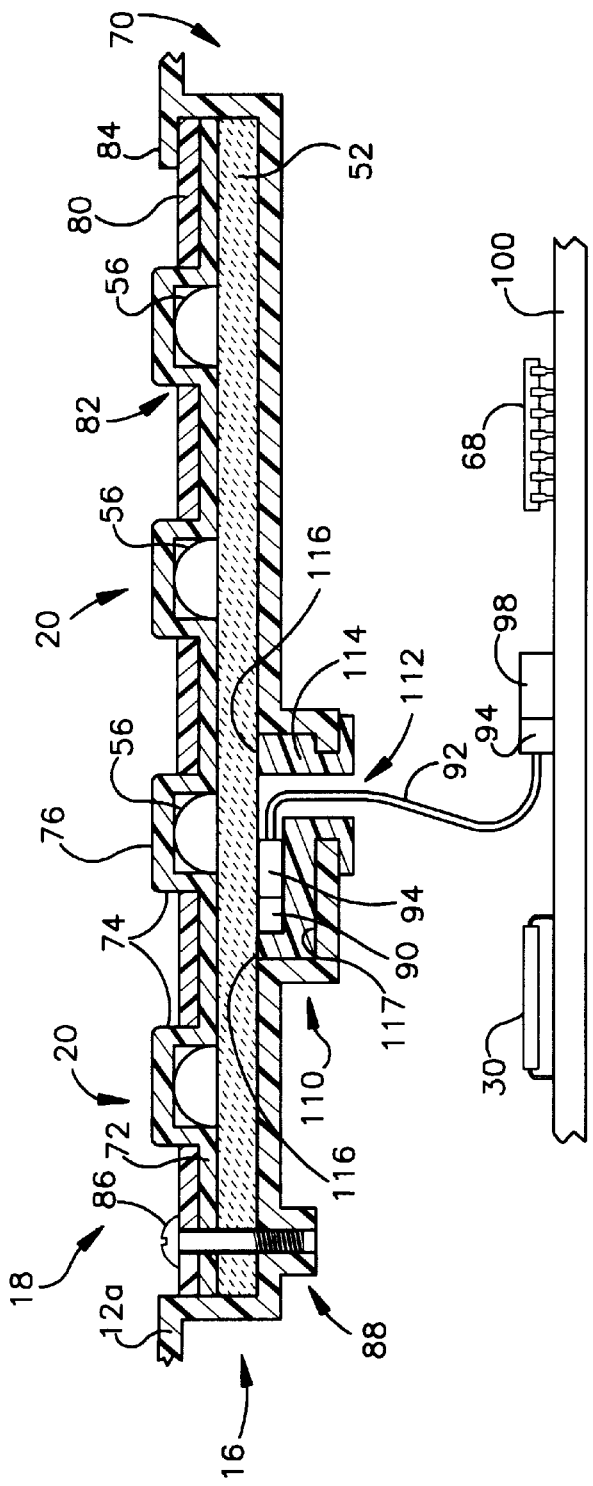
FIG. 5 is a cross-sectional view of a keypad module and main housing configuration taken along line A—A of FIG. 1 in accordance with a first embodiment of the present invention.

Referring now to FIG. 5, a first example of a keypad module 18 is shown. In this particular embodiment, the receiving area 16 of the main housing 12 is made up of a recess 70 formed by the surface of the housing portion 12a. The dimensions of the recess 70 correspond to the outer perimeter of the keypad matrix substrate 52. A keypad cover 72 made of a flexible, waterresistant/liquid-resistant/debris-resistant elastomer layer is placed over the matrix substrate 52. The cover 72 includes protrusions 74 which are formed within the elastomer layer. Each protrusion 74 is aligned with and provides clearance for a corresponding underlying flexible dome contact 56. The protrusions 74 are flexible such that when pressed the protrusions will collapse causing the dome contact 56 thereunder to also collapse.

The top surface 76 of each protrusion 74 includes thereon the aforementioned label defining the operation of the particular key 20 formed by the protrusion 74 and underlying contact 56. The labels may be formed on the top surface 76 using any one of various known printing techniques.

A bezel 80 made of rigid molded plastic or the like is positioned on top of the cover 72 as shown in FIG. 5. The bezel 80 is primarily a sheet of material with an array of apertures 82 positioned so as to correspond with the locations of the respective keys 20. The apertures 82 permit the protrusions 74 to extend there through so as to be exposed to the operator. The bezel 80 serves to hold the cover 72 in place within the keypad.

Thus, the keypad cover 72 is sandwiched between the matrix substrate 52 and the bezel 80 to form the modular keypad 18. The housing portion 12a includes a lip 84 under which one edge of the keypad 18 is placed during assembly. The opposite edge of the keypad 18 is held in position by a screw 86 or other fastening device. The main housing portion 12a includes a threaded screw hole 88 for receiving the screw 86.

The matrix substrate 52 includes a series of through holes (not shown) which connect the row and column traces 54a and 54b to the bottom side of the substrate where a surface mount connector terminal 90 is provided thereon. The terminal 90 thus provides an electrical connection to each of the row and column traces 54a and 54b. A ribbon cable 92 with a zero-insertion force connector 94 at each end is connected at one end to the terminal 90. The other end of the ribbon cable 92 is connected to a terminal 98 included on a main circuit board 100 within the main housing 12. The terminal 98 is coupled to the scanning circuitry 68 which is located on the main board 100 via appropriate traces formed thereon. Also located on the main board 100 is the processor 30 and various other components (not shown) described above in relation to FIG. 3.

The recess 70 includes a sub-recess 110 formed in the main surface of the housing portion 12a as shown in FIG. 5. The sub-recess 110 provides clearance for the terminal 90 and connector 94 attached to the bottom surface of the substrate 52. In addition, the sub-recess 110 includes an aperture 112 that allows for the ribbon cable 92 and connector 94 to be passed there through during assembly. A rubber or elastomer grommet 114 is included in the aperture 112 for providing a seal between the environment outside of the PDT 10 and the main circuitry within the housing 12 (e.g., the main board 100). The lip 84 and screw 86 cause the bezel 80 to press down on the cover 72 and matrix substrate 52 with sufficient force to form a press seal at the areas 116 where the bottom surface of the substrate 52 engages the grommet 114. Similarly, a press seal is formed at the areas 117 where the grommet 114 is pressed into engagement with the surface of the main housing portion 12a in the sub-recess 110. Thus, dirt, debris, water, etc. are prevented from entering into the main housing 12 via the aperture 112.

Furthermore, the lip 84 and the screw 86 cause the bezel 80 to be pressed down upon the top surface of the matrix substrate 52 with the elastomer cover 72 therebetween. Consequently, the elastomer cover 72 forms a press seal against dirt and water, for example, along the top surface of the matrix substrate 52. This protects the row and column traces 54a, 54b on the substrate from contamination, for example.

Figure 6:
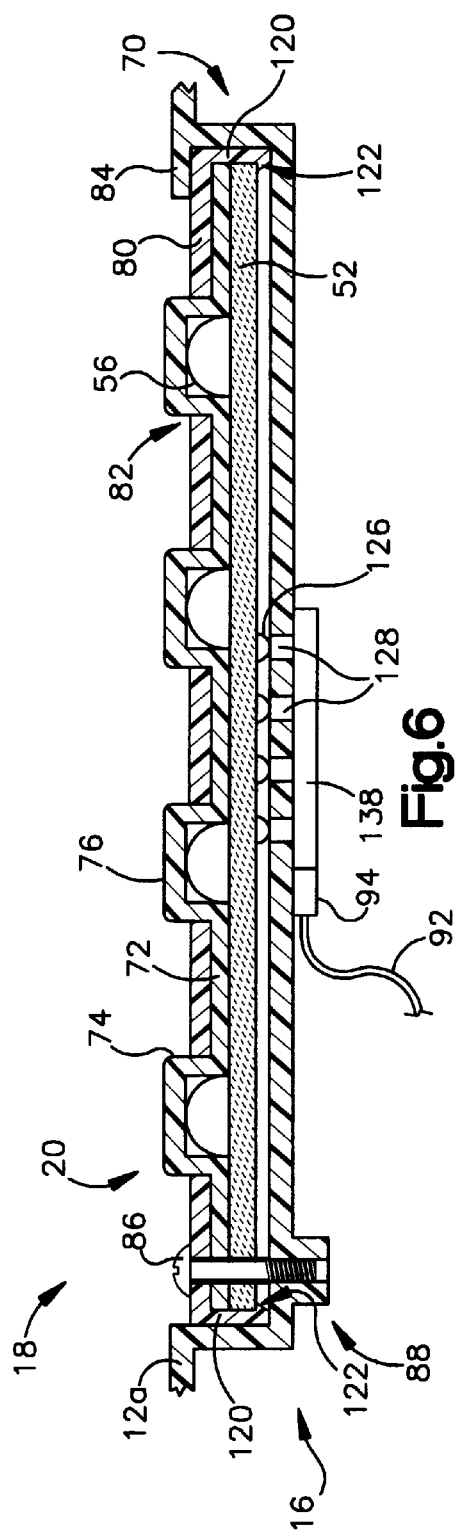
FIG. 6 is a cross-sectional view of a keypad module and main housing configuration taken along line A—A of FIG. 1 in accordance with a second embodiment of the present invention.

FIG. 6 illustrates another embodiment of each keypad module 18. As with the other embodiments described herein, only the differences will be discussed in detail. In FIG. 6, the bezel 80 includes extensions 120 on at least two opposite edges, and preferably all four edges, as shown. The extensions 120 include inwardly projecting protrusions 122 at the distal ends thereof. The protrusions 122 extend under the bottom surface of the matrix substrate 52 and serve to provide a snap fit combination of the bezel 80 and substrate 52 with the cover 72 pressed therebetween. Thus, the keypad module 18 remains as one integral unit. In addition, a conformal coating is formed on the bottom surface of the substrate 52 in the area of the snap fit by the protrusions 122 in order to form a seal to further protect from water/dirt/debris working its way underneath the cover 72.

The keypad module 18 is also different from the embodiment shown in FIG. 5 in that the row and column traces 54a, 54b from the top surface of the substrate 52 pass via through holes to the bottom surface of the substrate 52 and terminate at respective electrical contacts 126 formed thereon. The main surface of the recess 70 includes corresponding electrical contacts 128 which each extend through the main housing portion 12a and are aligned in pressed engagement with a respective contact 126. A terminal 130 from which the contacts 128 are projected is mounted on the bottom of the main surface of the housing portion 12a, within the main housing 12. The zero-insertion force connector 94 from the ribbon cable 92 is connected to the terminal 130 to provide an electrical connection between the row and column traces 54a and 54b on the substrate 52 and the scanning circuitry 68 (FIG. 5). Since the contacts 126 and 128 provide an electrical connection between the keypad module 18 and the circuitry within the housing 12 without requiring an aperture for the cabling as in the embodiment of FIG. 5, there still is provided an environmental seal between the outside of the PDT 10 and the circuitry within the housing 12 even without the grommet 114.

FIG. 7 illustrates yet another embodiment of the keypad module 18. This embodiment is similar to the embodiment shown in FIG. 6, with the exception that the bezel 80 does not form a snap fit with the substrate 52 so as to form an integral unit. Namely, the bezel 80 serves to hold the cover 72 in place while exerting a downward pressing force on the cover 72 and substrate 52 via the lip 84 and screw 86. Again, the compression of the elastomer cover 72 forms a seal with respect to the top surface of the substrate 52 so as to protect from water/dirt/debris. Moreover, the electrical contacts 128 formed on the surface of the main housing portion 12a eliminates the need for an aperture there through.

The embodiments described above in connection with FIGS. 5–7 contemplate a modular keypad 18 which is assembled with the main housing 12 via the outside of the housing 12. However, the present invention is not limited to such a construction. For example, the embodiment of FIG. 8 represents another approach for combining a modular keypad 18 with the housing 12.

Referring to FIG. 8, the receiving area 16 in this embodiment is represented by an aperture 150 formed on the surface of the main housing portion 12a. The edge defining the aperture 150 includes a shoulder 152 against which the perimeter of the bezel 80 rests. The matrix substrate 52 is mounted to the bottom surface of the main housing portion 12a with the elastomer cover 72 pressed therebetween as shown. A plurality of screws 86 or other fastening means is used to attach the matrix 52 to the main housing portion 12a.

As shown in FIG. 8, the elastomer cover 72 is held in pressed engagement with the main housing portion 12a along the edge of the aperture 150. Such pressed engagement forms a seal in the areas 156 along the edge of the aperture. Consequently, water/dirt/debris from the outside of the PDT 10 cannot reach the inside of the main housing 12 via the aperture 150. Moreover, the bezel 80 presses down against the cover 72 as in the other embodiments in order to form a seal protecting the traces 54a, 54b on the top surface of the substrate 52.

Figure 9:
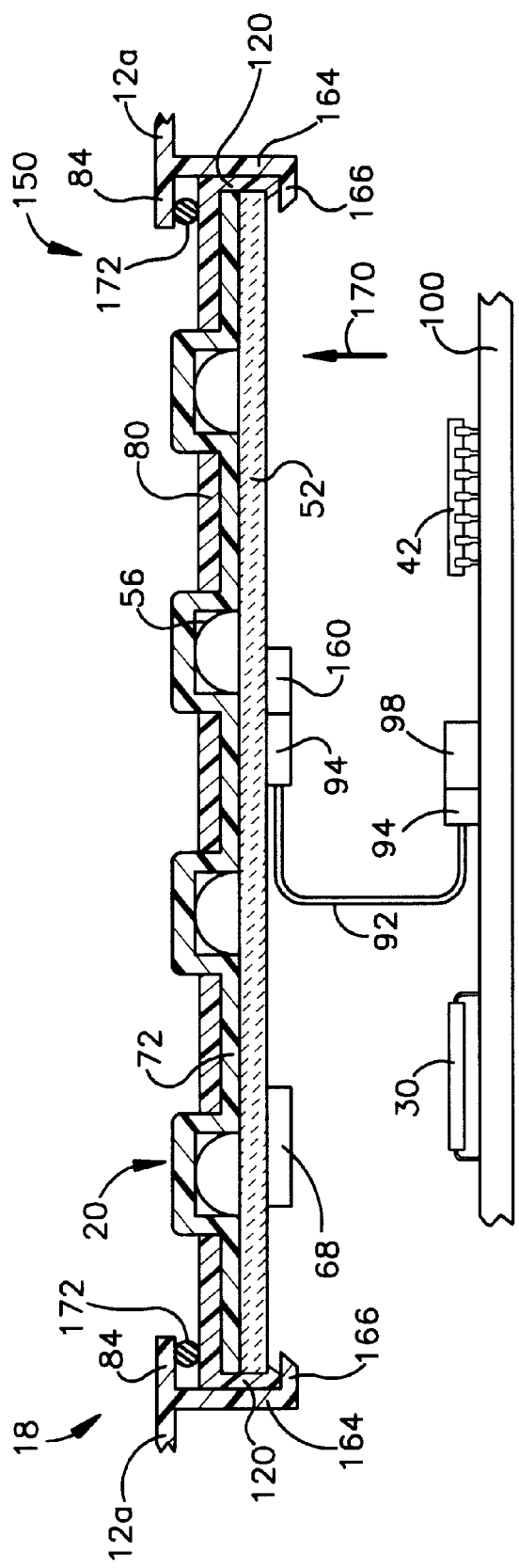
FIG. 9 is a cross-sectional view of a keypad module and main housing configuration taken along line A—A of FIG. 1 in accordance with a fifth embodiment of the present invention.

The embodiment of FIG. 9 includes a keypad module 18 having a snap fit bezel 80 similar to the embodiment of FIG. 6. In this embodiment, however, the scanning circuitry 68 is mounted on the bottom surface of the substrate 52. The scanning circuitry 68 is connected to the respective row and column traces 54a, 54b formed on the top surface of the substrate 52 via respective through holes (not shown). The output of the scanning circuitry 68 is coupled to a terminal 160 also mounted on the bottom surface of the substrate. The ribbon cable 92 with connectors 94 in this particular embodiment serves to connect the output of the scanning circuitry 68 to the I/O logic array 42 on the main board 100. In addition, the ribbon cable 92 provides power to the scanning circuitry 68 mounted on the substrate 52.

Also in the embodiment of FIG. 9, the aperture 150 is defined by an edge of the main housing portion 12a which includes a lip 84 and downward projection legs 164. The distal ends of the projection legs 164 include an inwardly directed projection 166. The projection legs 164 are flexible in an outer direction in order to allow the keypad module 18 to be snap fit into the aperture 150 upon being inserted from the bottom in the direction represented by arrow 170. This permits the keypad module 18 to be retained in place between the lower surface of the lip 84 and the projections 166.

As shown in FIG. 9, a grommet or O-ring 172 is placed between the lower surface of the lip 84 and the bezel 80 so as to be pressed therebetween. The grommet or O-ring 172 serves to provide a seal along the perimeter of the aperture 150 so that water/dirt/debris/etc. is prevented from entering the main housing 12 via the aperture 150.

Figure 10:
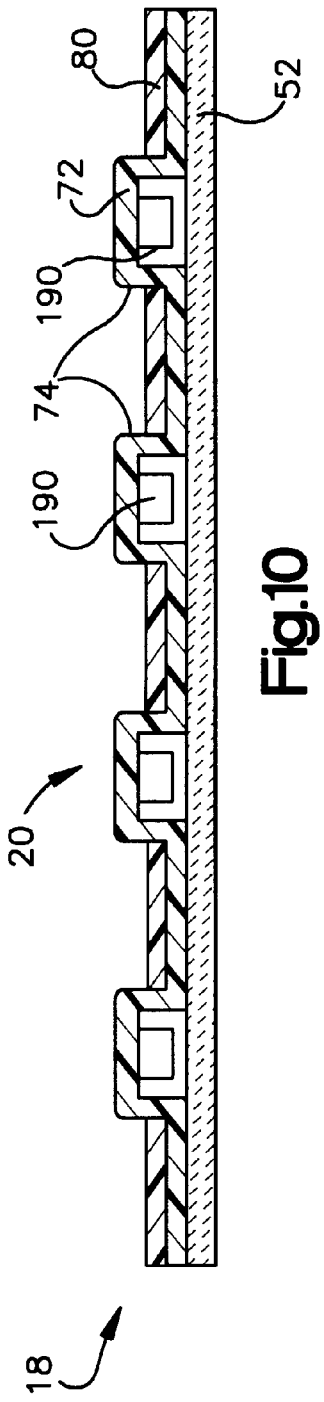
FIG. 10 is a cross-sectional view of a keypad module in accordance with another embodiment of the present invention.

Referring briefly to FIG. 10, another embodiment of the keypad module 18 is shown which is suitable for use in place of the keypad module discussed above in connection with the embodiments of FIGS. 5–9. In the embodiments of FIGS. 5–9, the keypad matrix 52 includes flexible dome contacts 56 which cause the corresponding electrical connection between the intersecting row traces 54a and column traces 54b on the surface of the matrix 52 when depressed. Alternatively, the keypad matrix 52 may omit the contacts 56 as shown in FIG. 10. In their place, the elastomer layer 72 has molded or otherwise secured within each protrusion 74 an electrical contact 190.

The electrical contacts 190 are each made of an electrically conductive material such as a carbon-based conductive material. The electrical contacts 190 are exposed from the lower surface of the elastomer layer 72 as shown in FIG. 10. When a given protrusion 74 is depressed by an operator, the protrusion 74 will collapse towards the surface of the substrate 52 such that the electrical contact 190 will engage exposed contacts of the row trace 54a and column trace 54b intersecting thereat. The electrical contact 190 in such instance is responsible for providing the electrical connection between the row trace 54a and the column trace 54b. When pressure is removed from the protrusion 74, the resilient nature of the elastomer layer 72 causes the electrical contact 190 to return to a position whereby the intersecting row trace 54a and column trace 54b are again electrically isolated thereat.

It will be appreciated that the embodiment of FIG. 10 can be readily substituted in each of the embodiments described above. The scope of the invention is intended to include any such embodiments. In addition, it will be appreciated that various other embodiments of the keypad module are possible without departing from the scope of the invention.

Accordingly, the present invention provides a portable data terminal which is capable of receiving a plurality of different keypad modules depending on the particular application. Appropriate protection against adverse environmental conditions (e.g., water, dirt, debris) is provided as a result of seals created between the keypad module and the main housing. This avoids the portable data terminal failing due to water, dirt, debris, etc. which otherwise may enter a portable data terminal designed to receive a modular keypad.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A portable data terminal, comprising:
    a main housing including therein electronic circuitry for receiving data via an operator input, and further including a receiving area;
    a keypad module which is selectively securable into the receiving area of the main housing, the keypad module including keys which may be pressed by an operator;
    coupling means for providing an electrical connection between the keypad module and the electronic circuitry within the main housing and forming an environmental seal between the receiving area an interior of the main housing in which the electronic circuitry is located when the keypad is secured into the receiving area.

2. The portable data terminal of claim 1, wherein the keypad module includes a plurality of key associated contacts formed at intersections of row and column conductive traces formed on a surface of a keypad matrix, and the keypad module further includes an elastomer cover and bezel such that when the keypad module is secured into the receiving area the bezel compressibly seals the elastomer cover against the surface of the keypad matrix to reduce the introduction of contaminants to the row and column conductive traces.

3. The portable data terminal of claim 1, wherein the keypad module includes a plurality of key associated contacts formed at intersections of row and column conductive traces formed on a surface of a keypad matrix, and the keypad module further includes an elastomer cover and bezel with extensions such that the extensions of the bezel hold the bezel in pressed engagement with the keypad matrix with the elastomer cover therebetween so as to compressibly seal the elastomer cover against the surface of the keypad matrix to reduce the introduction of contaminants to the row and column conductive traces.

4. The portable data terminal of claim 1, wherein the coupling means comprises a connector mounted on a rear surface of the keypad matrix, an aperture in the main housing, a cable running from the connector through the aperture to the electronic circuitry within the main housing, and a grommet which forms a press seal between the rear surface of the keypad matrix and an area surrounding the aperture.

5. The portable data terminal of claim 1, wherein the coupling means comprises a plurality of contacts formed along a surface of the main housing which defines the receiving area, the plurality of contacts being operatively coupled to the electronic circuitry and arranged to operatively engage a corresponding plurality of contacts included in the keypad module when the keypad module is secured in the receiving area.

6. The portable data terminal of claim 1, wherein the receiving area includes an aperture in the main housing and the coupling means comprises a grommet which forms a seal between a surface of the keypad module and an area surrounding the aperture when the keypad module is secured in the receiving area.

7. The portable data terminal of claim 1, wherein the receiving area comprises an aperture in the main housing, the keypad module includes a plurality of key associated contacts formed at intersections of row and column conductive traces formed on a surface of a keypad matrix, the keypad module further includes an elastomer cover and bezel such that when the keypad module is secured into the receiving area the bezel compressibly seals the elastomer cover against the surface of the keypad matrix to reduce introduction of contaminants to the row and column conductive traces, and the elastomer cover serves to form a compressible seal in an area surrounding the aperture to reduce introduction of contaminants into the main housing through the aperture.

8. The portable data terminal of claim 1, further including a scanning circuit for detecting activation of the keys included in the keypad module, the scanning circuit being physically integral with the keypad module.

9. The portable data terminal of claim 1, further including a scanning circuit for detecting activation of the keys included in the keypad module, the scanning circuit being physically integral with the electronic circuitry in the main housing.

10. The portable data terminal of claim 1, wherein the receiving area is an aperture in the main housing.

11. The portable data terminal of claim 1, wherein the receiving area is a recess in the main housing.

12. The portable data terminal of claim 1, further comprising a bar code reader serving as an operator input.

13. The portable data terminal of claim 1, further comprising a wireless communication transceiver included within the main housing.

14. The portable data terminal of claim 13, wherein the transceiver comprises a radio frequency transceiver.

* * * * *